United States Patent
Karsteter et al.

(10) Patent No.: US 10,377,233 B2
(45) Date of Patent: Aug. 13, 2019

(54) UTILITY TABLE

(71) Applicant: Gettle Incorporated, Emigsville, PA (US)

(72) Inventors: Burton F. Karsteter, Hanover, PA (US); Bryan J. Glatfelter, York, PA (US); Roman D. Bair, Littlestown, PA (US); James F. Smith, Hanover, PA (US); Charles Little, Hanover, PA (US); Dwane Prowell, York, PA (US)

(73) Assignee: Gettle Incorporated, Emigsville, PA (US)

( * ) Notice: Subject to any disclaimer, the term of this patent is extended or adjusted under 35 U.S.C. 154(b) by 170 days.

(21) Appl. No.: 15/455,898

(22) Filed: Mar. 10, 2017

(65) Prior Publication Data

US 2017/0258220 A1  Sep. 14, 2017

Related U.S. Application Data

(60) Provisional application No. 62/306,160, filed on Mar. 10, 2016.

(51) Int. Cl.
*B60K 26/02* (2006.01)
*B60K 1/04* (2019.01)
(Continued)

(52) U.S. Cl.
CPC .............. *B60K 26/02* (2013.01); *B60K 1/04* (2013.01); *B60K 7/0007* (2013.01); *B60K 17/356* (2013.01); *B60L 15/20* (2013.01); *B60L 50/66* (2019.02); *B60L 53/14* (2019.02); *B60K 2001/0405* (2013.01); *B60K 2007/0038* (2013.01); *B60K 2007/0092* (2013.01); *B60K 2026/025* (2013.01); *B60K 2026/029* (2013.01); *B60L 2200/40* (2013.01); *B60L 2240/12* (2013.01); *B60L 2250/12* (2013.01);
(Continued)

(58) Field of Classification Search
CPC .. E01C 19/42; E01C 2301/16; E01C 2301/18; B60K 26/02; B60K 1/04; B60K 2001/0405; B60K 2026/025; B60K 2026/029; B60L 15/00; B60L 2250/12
See application file for complete search history.

(56) References Cited

U.S. PATENT DOCUMENTS 3,604,325 A * 9/1971 Borges ..................... E01C 19/42
404/120
4,068,970 A * 1/1978 Rowe ..................... E01C 19/405
404/101

(Continued)

FOREIGN PATENT DOCUMENTS

FR         2693399 A1 * 1/1994 ............... B28B 1/29

*Primary Examiner* — Hanh V Tran
(74) *Attorney, Agent, or Firm* — Barley Snyder

(57) ABSTRACT

A utility table is provided and includes a support table, a plurality of drive wheels, a plurality of guide wheels, and a drive assembly. The support table includes a top frame with a support surface and a pair of side frames extending downward from opposite ends of the top frame. The plurality of drive wheels are positioned along and extend below each of the pair of side frames. The plurality of guide wheels are positioned along an inner surface of the pair of side frames. The drive assembly includes a power source and control system to power the plurality of drive wheels.

30 Claims, 17 Drawing Sheets

(51) Int. Cl.
*B60K 7/00* (2006.01)
*B60K 17/356* (2006.01)
*B60L 15/20* (2006.01)
*B60L 53/14* (2019.01)
*B60L 50/60* (2019.01)

(52) U.S. Cl.
CPC ............ *Y02T 10/645* (2013.01); *Y02T 10/705* (2013.01); *Y02T 10/7005* (2013.01); *Y02T 10/7072* (2013.01); *Y02T 10/72* (2013.01); *Y02T 10/7275* (2013.01); *Y02T 90/14* (2013.01)

(56) References Cited

U.S. PATENT DOCUMENTS

| | | | | |
|---|---|---|---|---|
| 4,320,987 A * | 3/1982 | Rowe | ................ | E01C 19/38 404/115 |
| 4,572,704 A * | 2/1986 | Allen | ................ | E01C 19/405 404/101 |
| 4,708,520 A * | 11/1987 | Rowe | ................ | E01C 19/264 404/103 |
| 4,741,643 A * | 5/1988 | Allen | ................ | E01C 19/405 404/114 |
| 4,822,210 A * | 4/1989 | Oury | ................ | E01C 19/405 404/106 |
| 5,988,939 A * | 11/1999 | Allen | ................ | E01C 19/38 404/113 |
| 6,112,736 A * | 9/2000 | Bearden | ................ | B23Q 9/0028 125/13.01 |
| 6,497,531 B2 * | 12/2002 | Sipherd | ................ | E01C 19/43 222/526 |
| 6,695,532 B2 * | 2/2004 | Somero | ................ | E01C 19/006 404/118 |
| 2012/0163912 A1* | 6/2012 | Lickel | ................ | E04F 21/247 404/85 |

* cited by examiner

UTILITY TABLE

CROSS-REFERENCE TO RELATED APPLICATION

This application claims the benefit of the filing date under 35 U.S.C. § 119(e) of U.S. Provisional Patent Application No. 62/306,160, filed on Mar. 10, 2016.

FIELD OF THE INVENTION

The present invention relates to a utility table, and more particularly, to a motorized utility table.

BACKGROUND

Movable utility tables used in concrete finishing applications are known in the art. Known utility tables commonly have wheels supporting a platform, which is disposed over and spaced apart from an elongated concrete surface to be finished. A concrete finishing worker lays on the platform facing down to the concrete surface and, due to the platform, can reach down to finish the concrete surface without unintentionally contacting the concrete surface. Other moving workers manually move the utility table along the length of the elongated concrete surface while the concrete finishing worker lays on the platform and finishes the concrete surface.

Known utility tables are commonly moved long distances, for example, approximately 300 yards, to finish a new elongated concrete surface each day. The moving workers engage in labor-intensive work to move the utility table over the required distance through concrete debris mixtures that accumulate on each side of the elongated concrete surface. Known utility tables thus require costly investments in demanding labor to finish each elongated concrete surface. There is consequently a need in the art for a motorized utility table.

SUMMARY

A utility table is provided and includes a support table, a plurality of drive wheels, a plurality of guide wheels, and a drive assembly. The support table includes a top frame with a support surface and a pair of side frames extending downward from opposite ends of the top frame. The plurality of drive wheels are positioned along and extend below each of the pair of side frames. The plurality of guide wheels are positioned along an inner surface of the pair of side frames. The drive assembly includes a power source and the control system to power the plurality of drive wheels.

BRIEF DESCRIPTION OF THE DRAWINGS

The invention will now be described by way of example with reference to the accompanying Figures, of which.

DETAILED DESCRIPTION OF THE EMBODIMENT(S)

Figure 1:
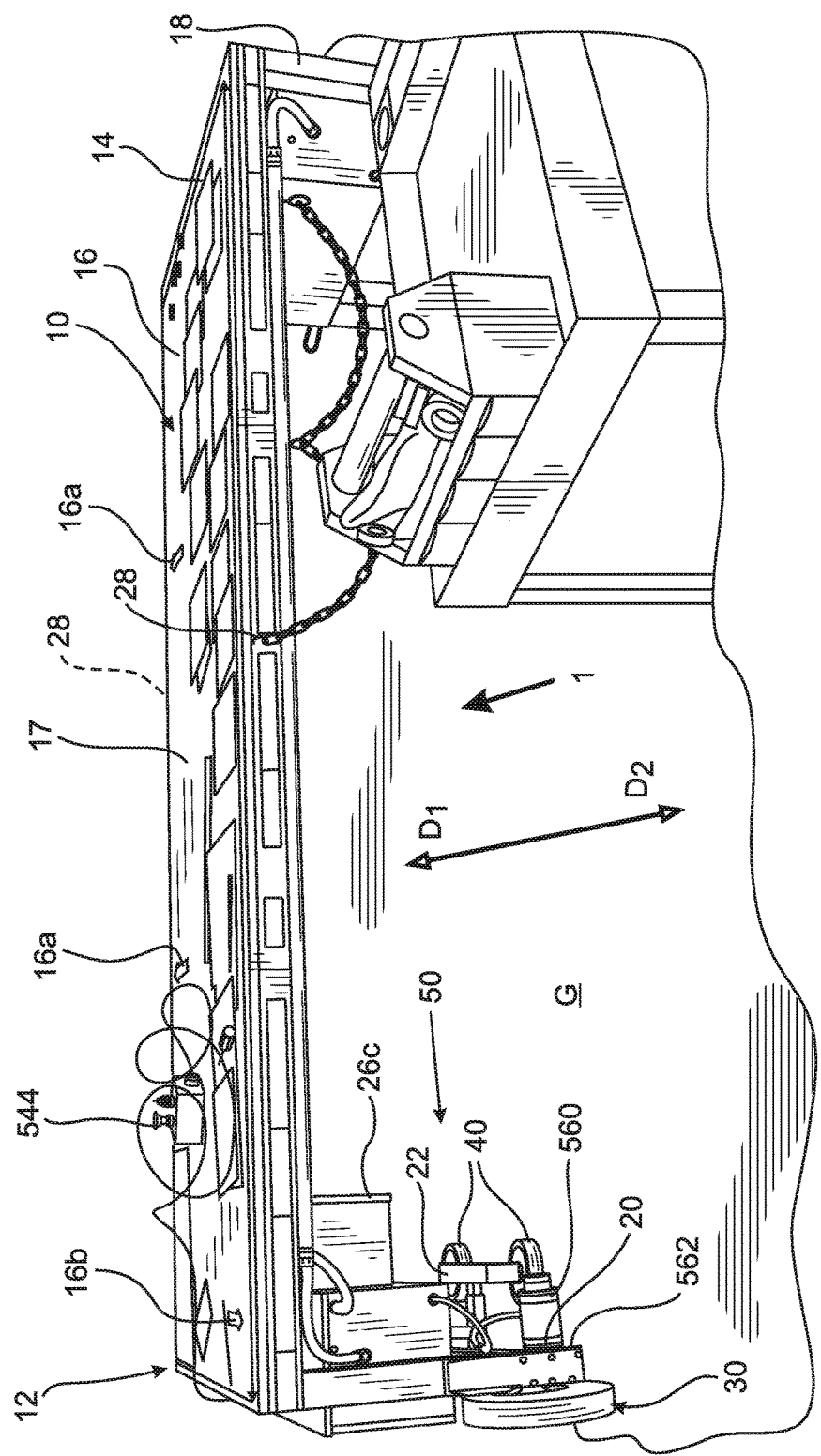
FIG. 1 is a perspective view of a motorized utility table according to the invention.

Embodiments of the present invention will be described hereinafter in detail with reference to the attached drawings, wherein like reference numerals refer to the like elements. The present invention may, however, be embodied in many different forms and should not be construed as being limited to the embodiments set forth herein; rather, these embodiments are provided so that the disclosure will be thorough and complete, and will fully convey the concept of the invention to those skilled in the art.

A motorized utility table 1 according to the invention is shown generally in FIG. 1. The motorized utility table 1 has a support table 10, a plurality of drive wheels 30, a plurality of guide wheels 40, and a drive assembly 50. The major components of the invention will now be described in greater detail.

Figure 2:
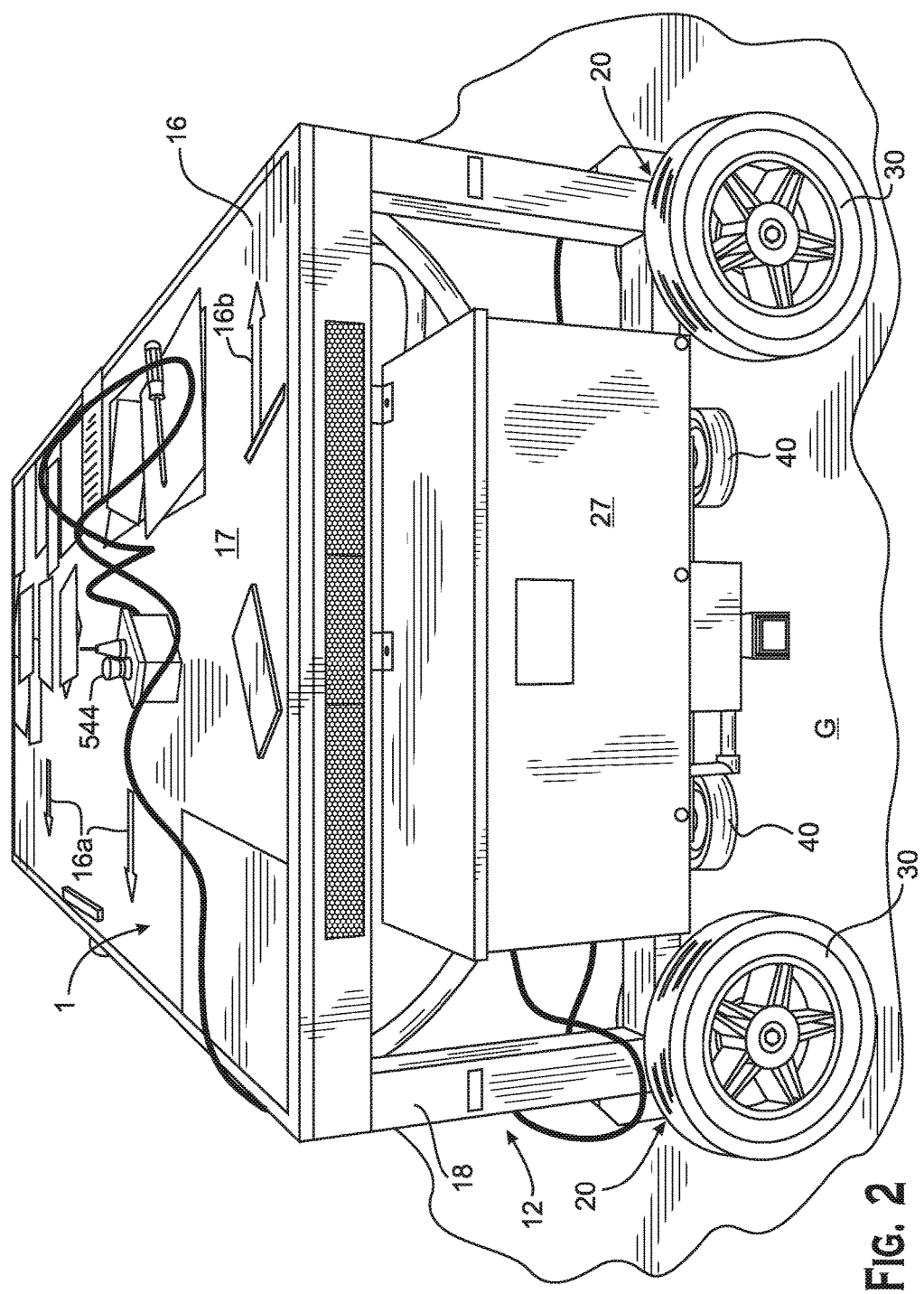
FIG. 2 is a side view of a first end of the motorized utility table according to the invention.

The support table 10 is shown generally in FIGS. 1 and 2. The support table 10, as shown in FIG. 1, has a first end 12 and an opposite second end 14. The support table 10 has a top frame 16, a pair of side frames 18, a plurality of wheel supports 20, a pair of guide supports 22, a plurality of battery compartments 24, a plurality of electrical control compartments 26, a plurality of compartment covers 27, and a plurality of carry hooks 28.

The top frame 16, as shown in FIG. 1, extends from the first end 12 to the second end 14 of the support table 10. In the shown embodiment, the top frame 16 has an elongated rectangular shape and includes a support surface 17 positioned along a top surface thereof. One with ordinary skill in the art would understand that the top frame 16 may alternatively have a square shape or other shapes in-keeping with the applications of the motorized utility table 1 described herein.

The top frame 16, as shown in FIGS. 1 and 2, has a plurality of first direction indicators 16a and a plurality of second direction indicators 16b. The plurality of first direction indicators 16a point in a first direction D1 and the plurality of second direction indicators 16b point in a second direction D2. In the shown embodiment, the plurality of first direction indicators 16a are a first type of arrow and the plurality of second direction indicators 16b are a second type of arrow. In other embodiments, the plurality of first direction indicators 16a and the plurality of second direction indicators 16b may be any other differentiated indicators known to those with ordinary skill in the art including written words and symbols.

Each of the pair of side frames 18, as shown in FIGS. 1 and 2, is positioned at one of the first end 12 and the second end 14 and extends downward from the top frame 16. In the embodiment shown in FIG. 2, each of the side frames 18 is a rectangular structure. One with ordinary skill in the art would understand that each of the side frames 18 may alternatively have a square structure.

The plurality of wheel supports 20, as shown in FIGS. 1 and 2, are disposed on each of the side frames 18 at lower corners of the side frames 18 opposite the top frame 16. In the shown embodiment, two wheel supports 20 are disposed on each side frame 18, with each wheel support 20 at one of the two lower corners of the side frame 18. One with ordinary skill in the art would understand that additional wheel supports 20 could be disposed elsewhere along a side of each side frame 18 opposite the top frame 16.

Figure 4:
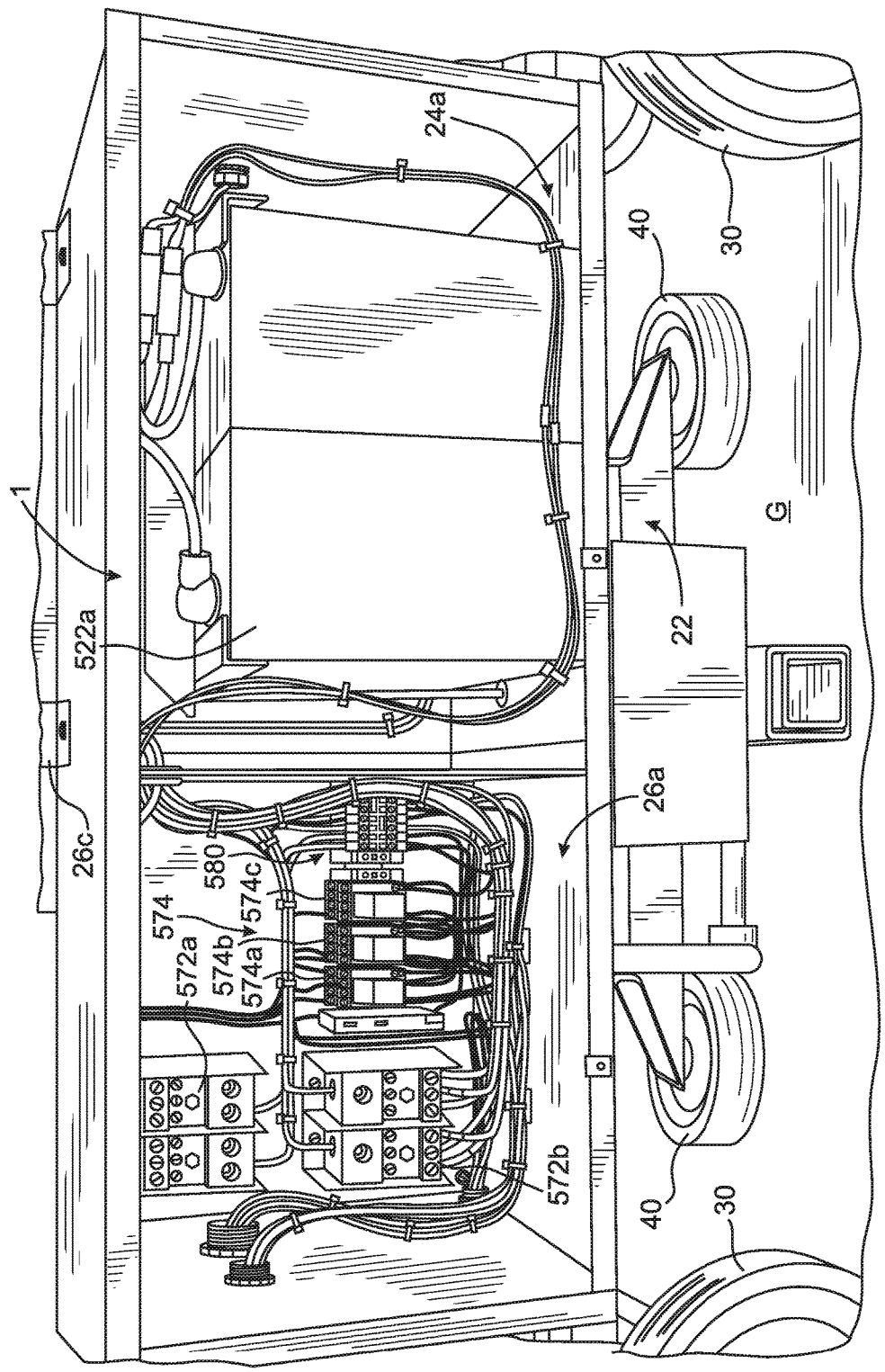
FIG. 4 is a detailed side view of the first electrical control compartment and a first battery compartment at the first end of the motorized utility table according to the invention.
Figure 5:
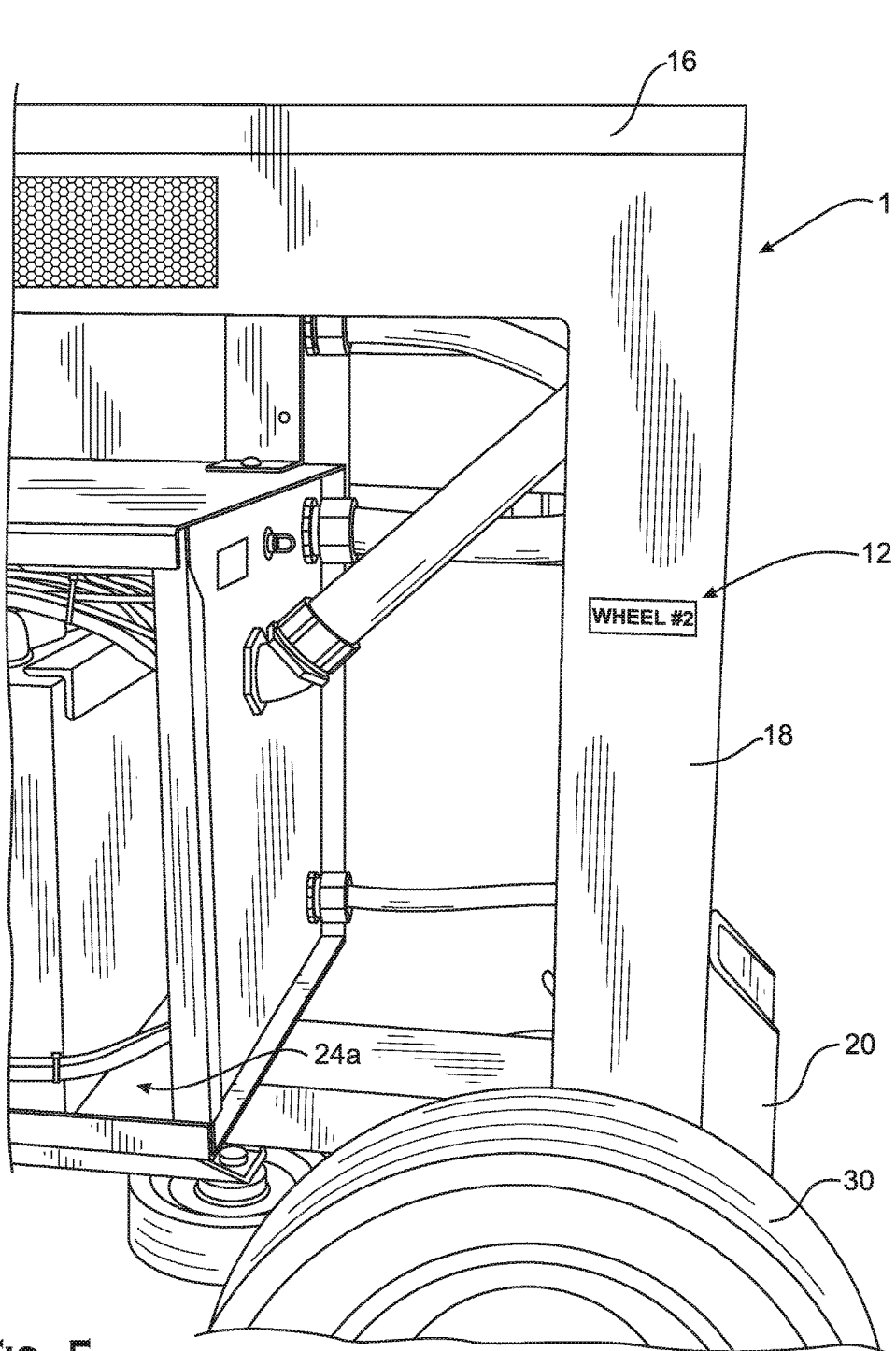
FIG. 5 is a detailed side view of the first battery compartment and another drive wheel at the first end of the motorized utility table according to the invention.
Figure 9:
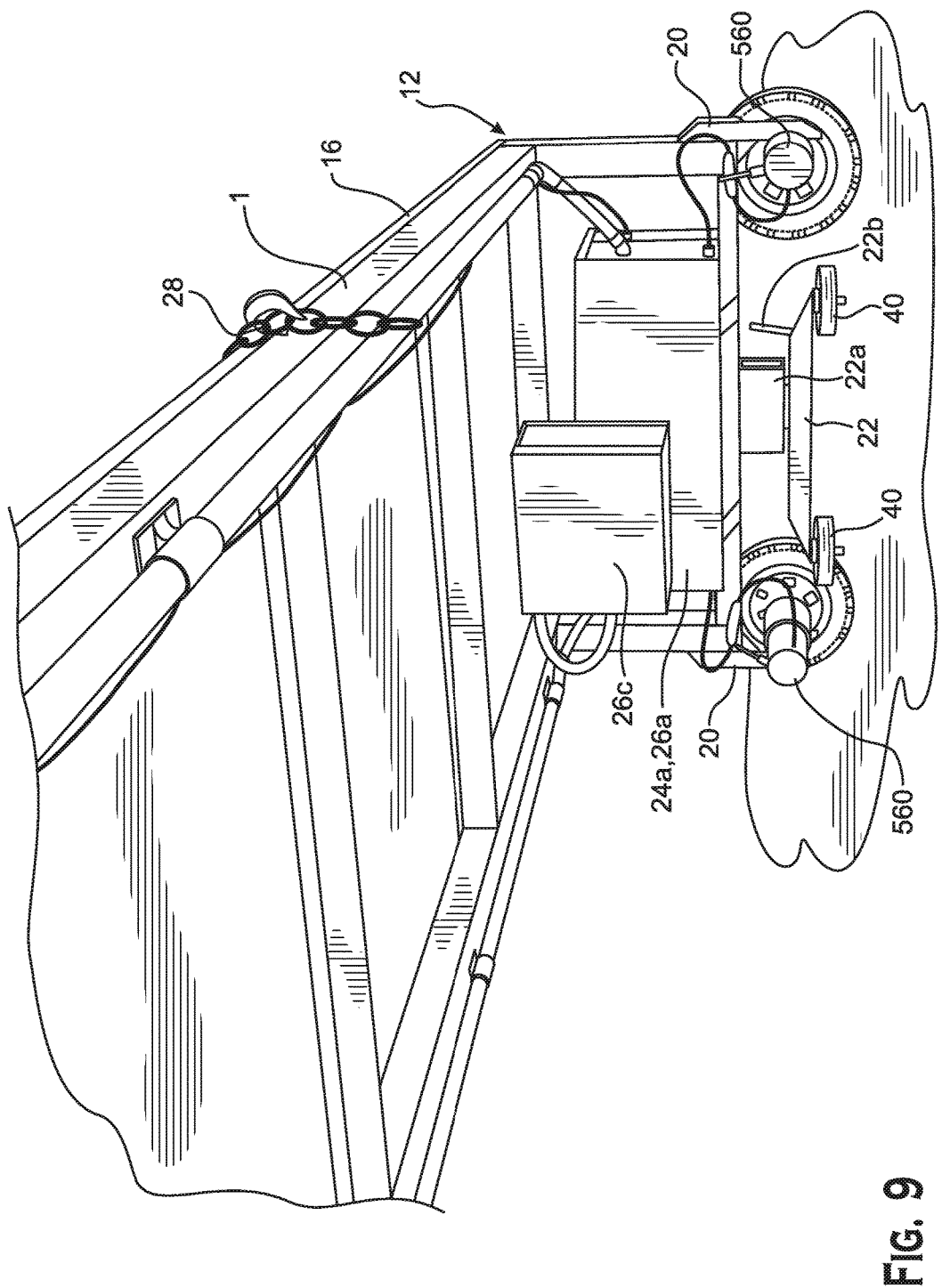
FIG. 9 is a side view of a third electrical control compartment at the first end of the motorized utility table according to the invention.

Each of the pair of guide supports 22, as shown in FIGS. 1, 4, and 9, is disposed between the plurality of wheel supports 20 on an inner side of one side frame 18. Each guide support 22 is attached to the side frame 18 by a resilient element 22a and a tubular element 22b shown in FIGS. 1 and 9.

Each guide support 22 is movable with respect to the side frame 18 by resilient deformation of the resilient element 22a. In an undeformed position, the resilient element 22a holds the guide support 22 at a first distance from the side frame 18, and in a deformed position, the resilient element 22a holds the guide support 22 at a second distance less than the first distance from the side frame 18. The resilient element 22a applies a resilient force in any deformed position urging the guide support 22 to the undeformed position.

Each guide support 22 is also movable with respect to the side frame 18 by controlled motion of the tubular element 22b. The tubular element 22b is controlled to slide in and out, changing the first distance between the guide support 22 and side frame 18 in the undeformed position of the resilient element 22a.

Figure 6:
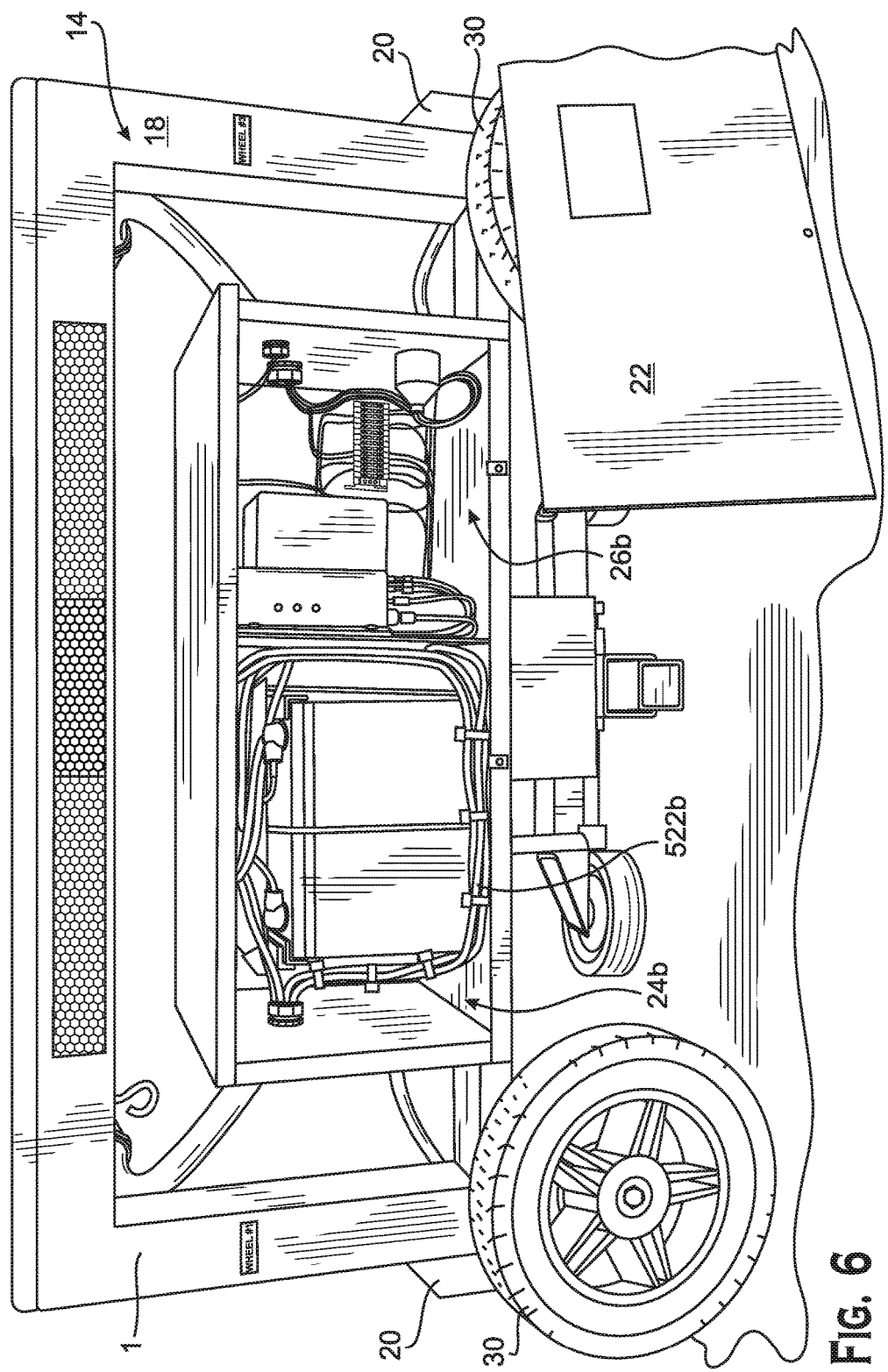
FIG. 6 is a side view of a second end of the motorized utility table according to the invention.

The plurality of battery compartments 24, as shown in FIGS. 4 and 6, include a first battery compartment 24a and a second battery compartment 24b. The first battery compartment 24a, as shown in FIG. 4, is disposed at the first end 12 of the support table 10 under the top frame 16 and is supported by the side frame 18 on the first end 12. The second battery compartment 24b, as shown in FIG. 6, is disposed at the second end 14 of the support table 10 under the top frame 16 and is supported by the side frame 18 on the second end 14. The first battery compartment 24a and the second battery compartment 24b are each disposed within the respective side frame 18 above the guide support 22. The first battery compartment 24a and the second battery compartment 24b, as shown in FIGS. 2, 4, and 6, may be enclosed by a removable compartment cover 27.

Figure 3:
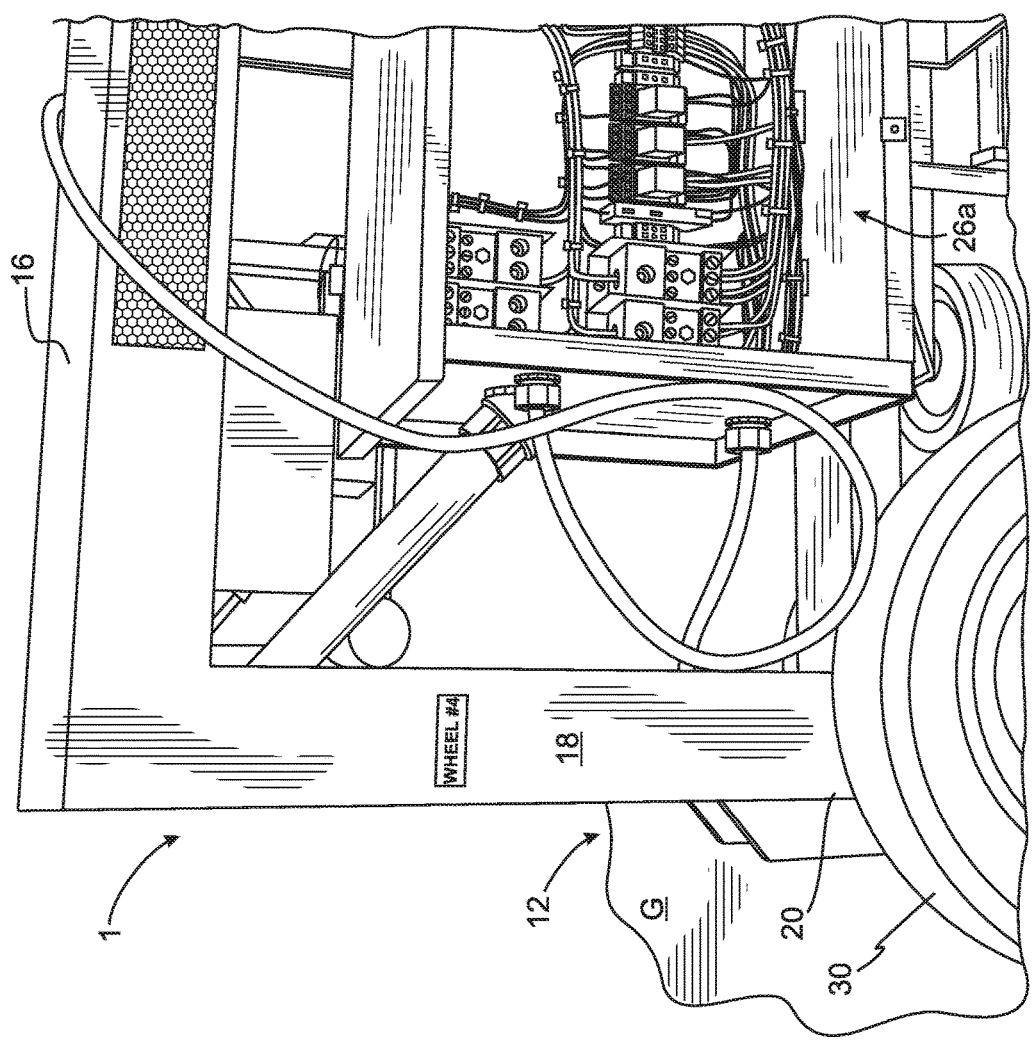
FIG. 3 is a detailed side view of a first electrical control compartment and a drive wheel at the first end of the motorized utility table according to the invention.

The plurality of electrical control compartments 26, as shown in FIGS. 3-7, include a first electrical control compartment 26a, a second electrical control compartment 26b, and a third electrical control compartment 26c. The first electrical control compartment 26a, as shown in FIGS. 3 and 4, is disposed at the first end 12 of the support table 10 under the top frame 16 and is supported by the side frame 18 on the first end 12. The second electrical control compartment 26b, as shown in FIG. 6, is disposed at the second end 14 of the support table 10 under the top frame 16 and is supported by the side frame 18 on the second end 14. The first electrical control compartment 26a and the second electrical control compartment 26b are each disposed within the respective side frame 18 above the guide support 22. The third electrical control compartment 26c is disposed at the first end 12 of the support table 10, and as shown in FIGS. 1, 4, and 9, is disposed adjacent an interior side of the first battery compartment 24a. The third electrical control compartment 26c is disposed closer to the top frame 16 than the first battery compartment 24a and first electrical control compartment 26a. The first electrical control compartment 26a, the second electrical control compartment 26b, and the third electrical control compartment 26c, as shown in FIGS. 2, 4, 6, and 10, may be enclosed by a removable compartment cover 27.

In the embodiment shown in FIGS. 2, 4, and 6, one compartment cover 27 removably encloses the first battery compartment 24a and the first electrical control compartment 26a together on the first end 12 and one compartment cover 27 removably encloses the second battery compartment 24b and the second electrical control compartment 26b together on the second end 14. As would be understood by one with ordinary skill in the art, alternatively, each of the plurality of battery compartments 24 and each of the plurality of electrical control compartments 26 could have an individual compartment cover 27. When one of the plurality of compartment covers 27 is attached to enclose at least one of the plurality of battery compartments 24 and/or at least one of the plurality of electrical control compartments 26, the enclosed compartments 24, 26, is electrical and fire rated.

Figure 12:
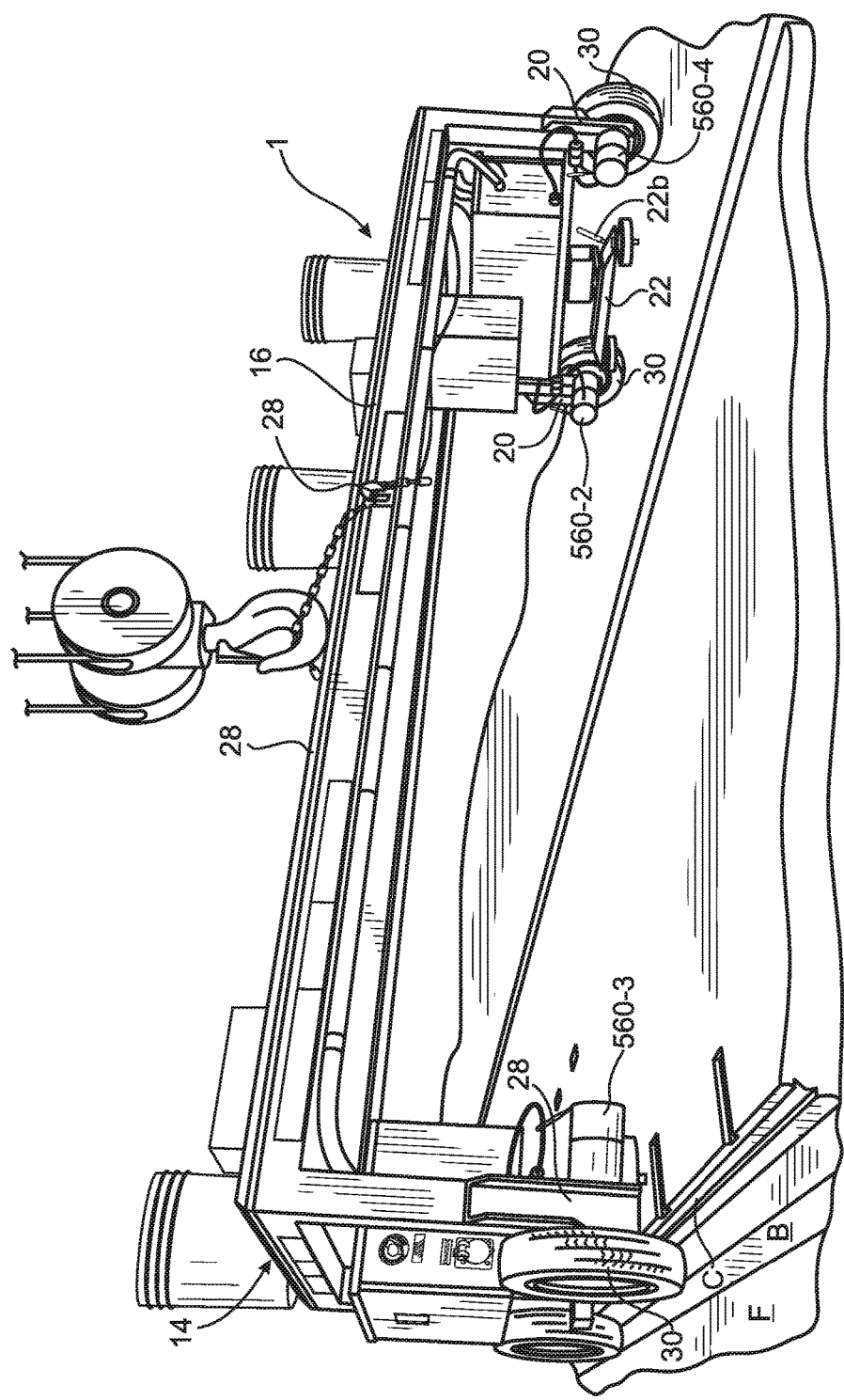
FIG. 12 is a perspective view of the motorized utility table according to the invention being lowered above an elongated concrete surface on a base.

The plurality of carry hooks 28, as shown in FIGS. 1 and 12, are attached to the top frame 16. Each carry hook 28 is disposed centrally along one longitudinal side of the top frame 16 extending between the first end 12 and the second end 14. In the shown embodiment, the carry hooks 28 are each eye hooks. One with ordinary skill in the art would understand that other types of hooks may be used as the carry hooks 28.

The plurality of drive wheels 30 are shown generally in FIGS. 1 and 2. The shown embodiment has four drive wheels 30, with one drive wheel 30 rotatably attached to the wheel support 20 at each lower corner of each side frame 18. One with ordinary skill in the art would understand that the number and location of drive wheels 30 along the side of each side frame 18 opposite the top frame 16 could vary. The plurality of drive wheels 30 extend below the side frames 18 and support the support table 10 off the ground G.

Figure 13:
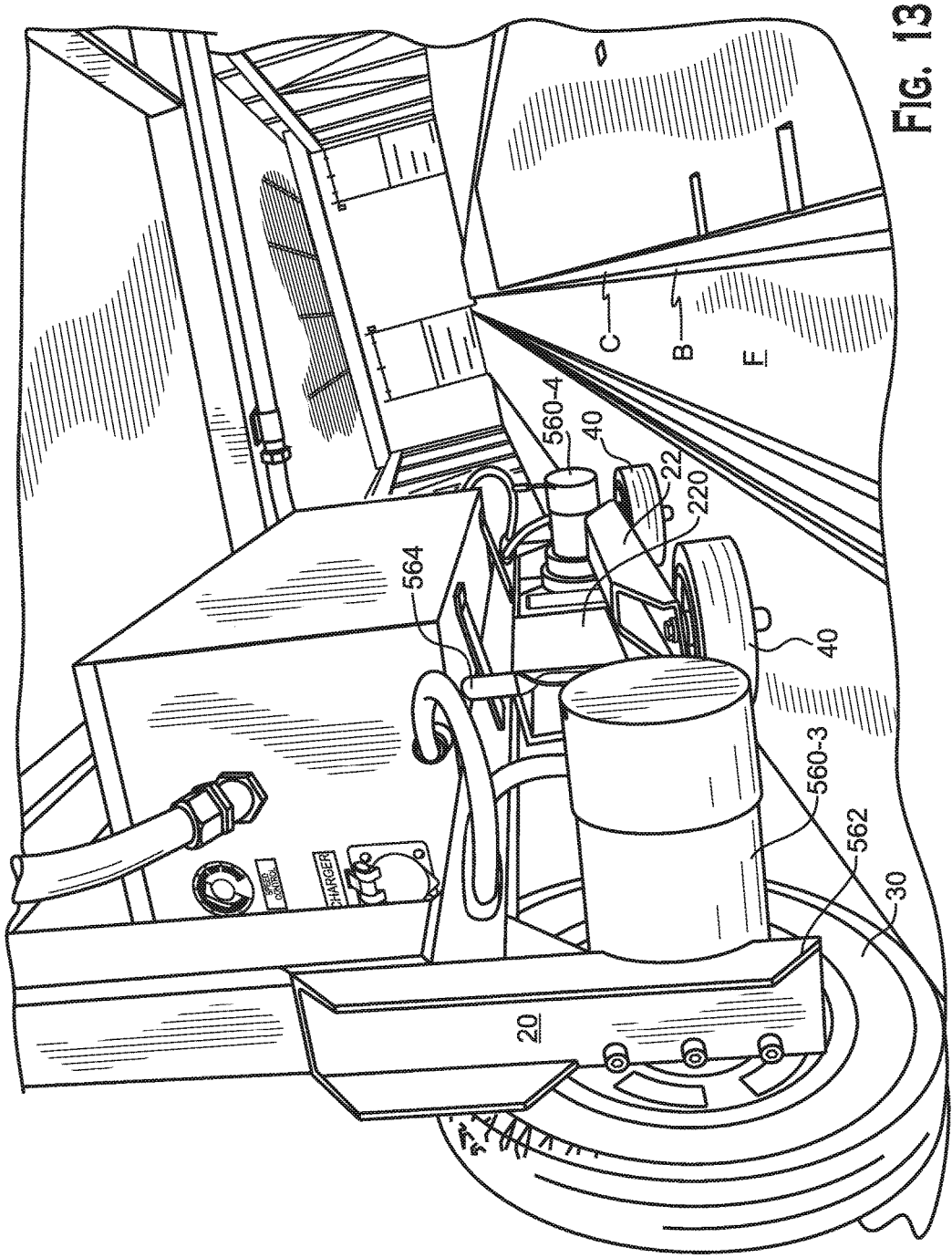
FIG. 13 is a perspective view of guide wheels and motors of the motorized utility table according to the invention.

The plurality of guide wheels 40 are shown generally in FIGS. 1 and 9. The shown embodiment has four guide wheels 40, with two guide wheels 40 rotatably attached to opposite ends of each guide support 22. The guide wheels 40, as shown in FIGS. 1 and 13, extend inward from the guide support 22. One with ordinary skill in the art would understand that the number and location of guide wheels 40 along each guide support 22 could vary.

The drive assembly 50 includes a power source 520, a control system 540, a plurality of motors 560, and an electrical system 570.

The power source 520, as shown in FIGS. 4 and 6-8, includes a plurality of batteries 522 and a charging system 530.

The plurality of batteries 522, as shown in FIGS. 4 and 6, includes a first set of batteries 522*a* and a second set of batteries 522*b*. The first set of batteries 522*a* is disposed in the first battery compartment 24*a* as shown in FIG. 4. The second set of batteries 522*b* is disposed in the second battery compartment 24*b* as shown in FIG. 6. In the shown embodiment, each of the first set of batteries 522*a* and the second set of batteries 522*b* comprises two 12 volt lead acid batteries. One with ordinary skill in the art would understand that the number and type of batteries comprising the first set of batteries 522*a* and the second set of batteries 522*b* could vary; for example, the plurality of batteries 522 may be lithium-ion batteries.

Figure 7:
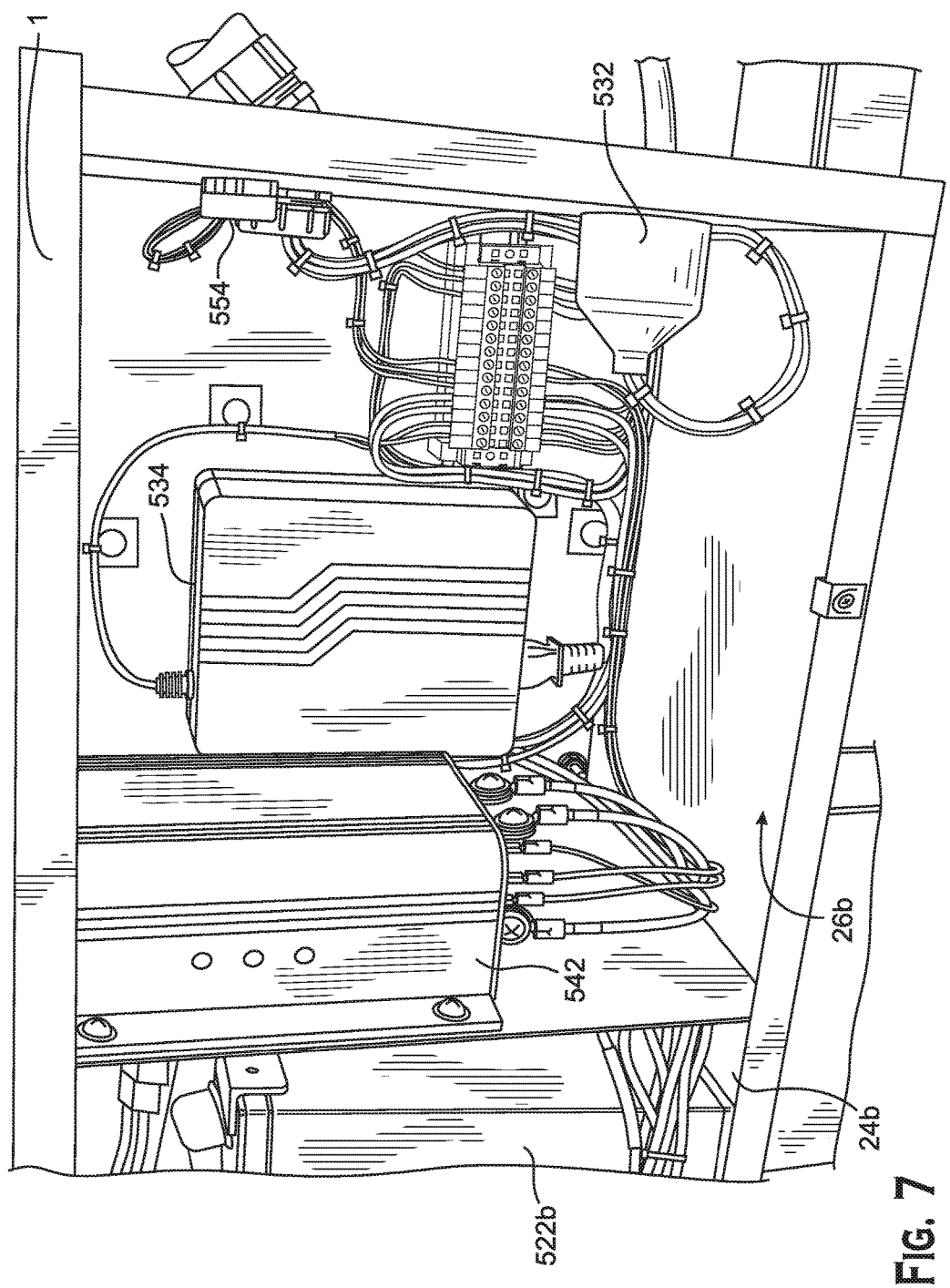
FIG. 7 is a detailed side view of a second electrical control compartment at the second end of the motorized utility table according to the invention.
Figure 8:
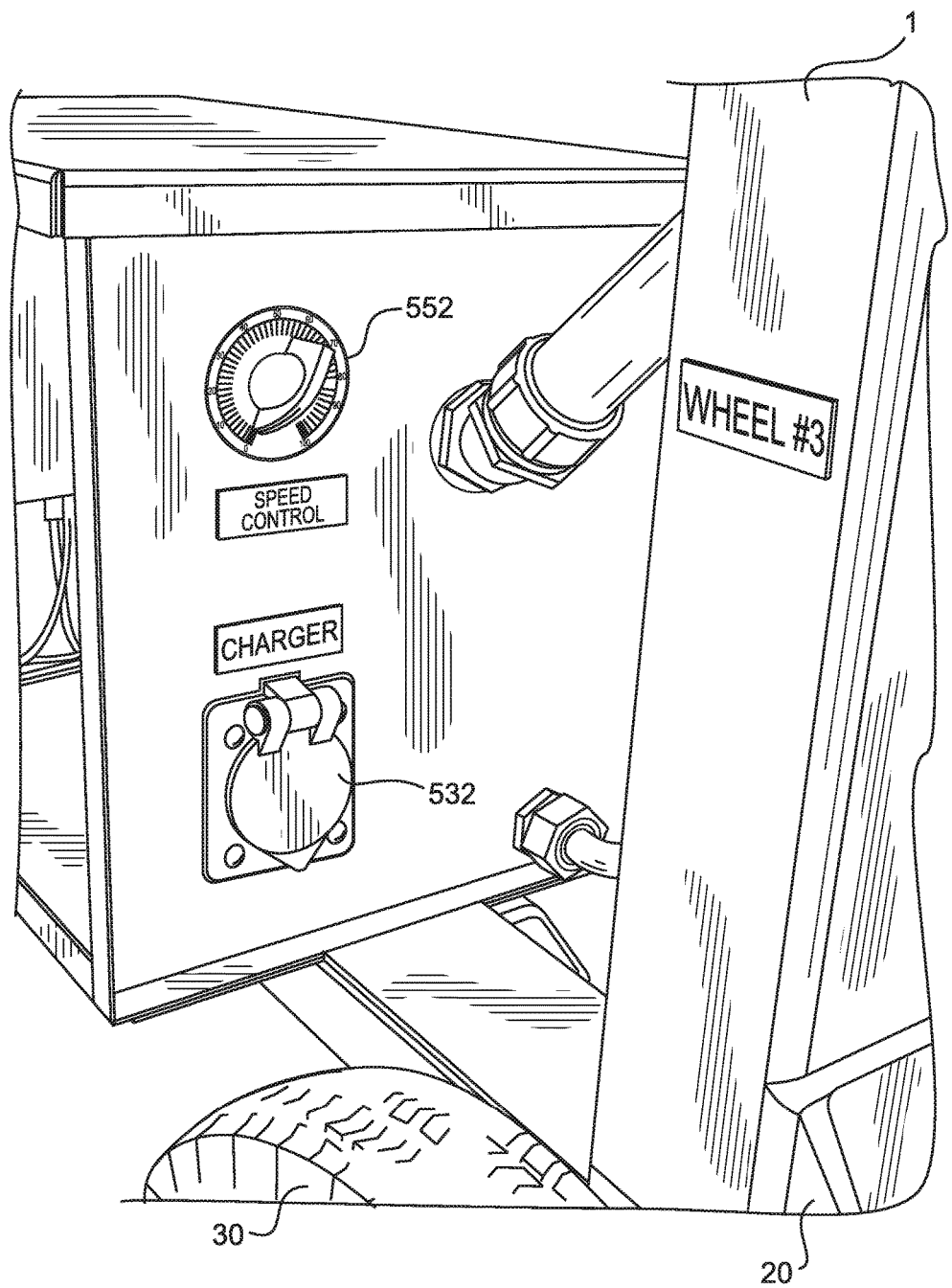
FIG. 8 is a detailed side view of a charging port and a speed input device at the second end of the motorized utility table according to the invention.

The charging system 530, as shown in FIGS. 7 and 8, is disposed in the second electrical control compartment 26*b* and includes a charging port 532 and a battery charger 534. The charging port 532 is disposed in a side wall of the second electrical control compartment 26*b* and may be any 120 volt receptacle capable of receiving a known 120 volt plug on an end of a power cord. The battery charger 534 is connected to the charging port 532 and is a device capable of receiving 120 volts of alternating current and outputting 24 volts of direct current.

Figure 11:
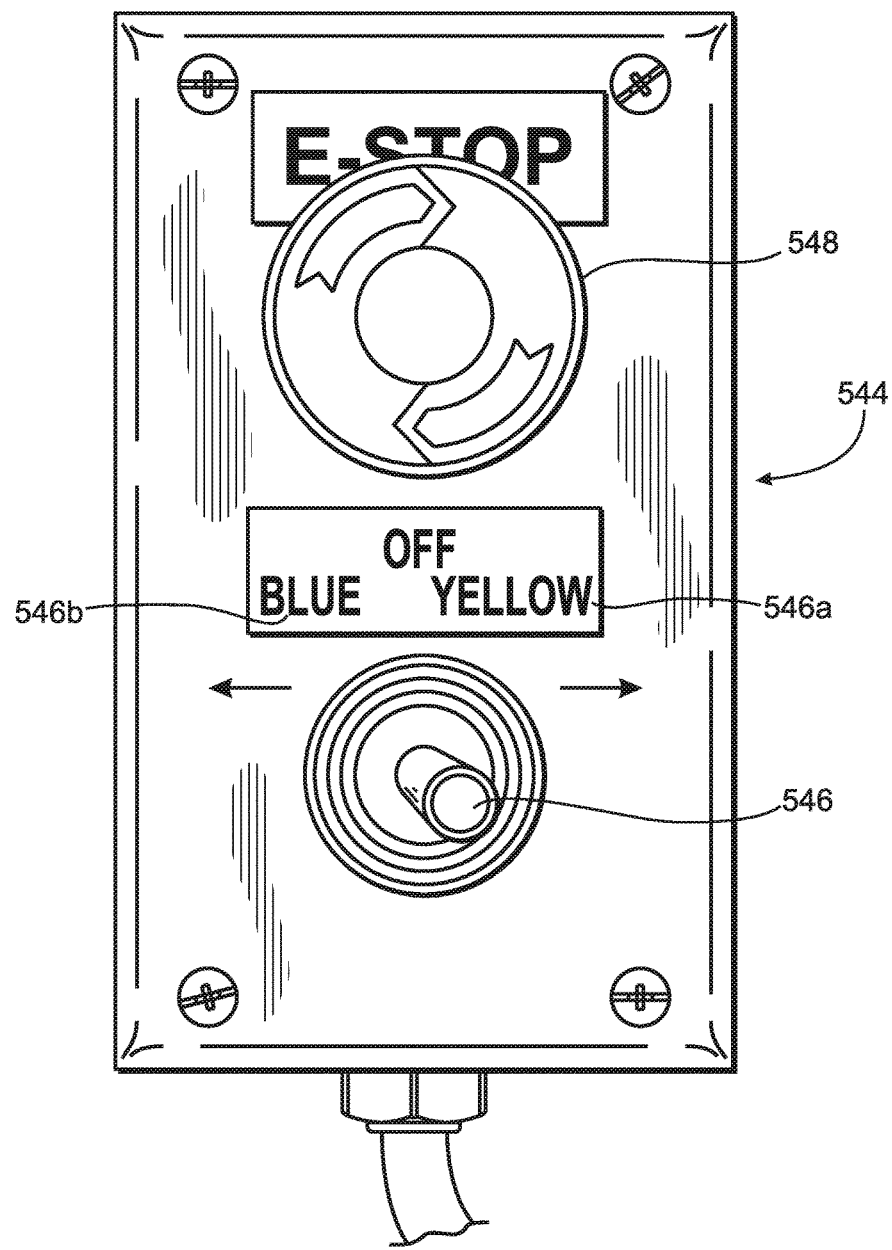
FIG. 11 is a plan view of a stop and start control system of the motorized utility table according to the invention.

The control system 540, as shown in FIGS. 7, 8, and 11, includes a controller 542, a stop and start control system 544, and a speed control system 550.

The controller 542, as shown in FIG. 7, is disposed in the second electrical control compartment 26*b*. The controller 542 may be any device capable of receiving a plurality of control inputs and outputting control signals to the plurality of motors 560; the controller 542 has a non-transitory computer readable medium storing program instructions thereon that, when executed by a processor of the controller 542, process the inputs to output the control signals. In the shown embodiment, the controller 542 is any generally available 250A 24V DC motor controller.

The stop and start control system 544 is shown in FIGS. 1 and 11. The stop and start control system 544 includes a joystick 546 and a stop button 548. The joystick 546 is movable in a first joystick direction 546*a* or a second joystick direction 546*b*. As shown in FIG. 1, the stop and start control system 544 is connected to the controller 542 but is unattached to any element of the support table 10 and can at least be positioned in a range of locations on the top frame 16.

The speed control system 550, as shown in FIGS. 7 and 8, includes a speed input device 552 and a speed potentiometer 554. The speed input device 552 is disposed in a side wall of the second electrical control compartment 26*b* as shown in FIG. 8. In the shown embodiment, the speed input device 552 is a dial adjustable by a user. One with ordinary skill in the art would understand that the speed input device 552 may alternatively be any device capable of being adjusted by a user to input a desired speed. The speed potentiometer 554 is disposed in the second electrical control compartment 26*b*, as shown in FIG. 7, and is connected to the speed input device 552. The speed potentiometer 554 is connected to the controller 542 and outputs a speed control signal indicative of a position of the speed input device 552 to the controller 542.

The plurality of motors 560 are shown in FIGS. 1, 9, 12, and 13. Each of the plurality of motors 560 is a generally available 24V electric motor. In the shown embodiment, the plurality of motors 560 include four motors, with one motor 560 attached to each lower corner of each side frame 18, and each of the four motors 560 connected to one drive wheel 30. In this embodiment, as shown in FIGS. 9, 12, and 13, the motors 560 include a first motor 560-1, a second motor 560-2, a third motor 560-3, and a fourth motor 560-4; the second motor 560-2 and the fourth motor 560-4 are attached to the side frame 18 at the first end 12 and the first motor 560-1 and the third motor 560-3 are attached to the side frame 18 at the second end 14. In other embodiments, the number of motors 560 is less than the number of drive wheels 30, and some of the drive wheels 30 are not connected to motors 560. In these embodiments, the drive wheels 30 unconnected to motors 560 are free wheels which move with motion of the motorized utility table 1.

The plurality of motors 560 are each connected to the controller 542 and, as shown in FIGS. 1 and 13, each include a gearbox 562 and a motor handle 564 connected to the gearbox 562. The motor handle 564 is operable to toggle the gearbox 562 between an engaged position and a disengaged position. In the engaged position of the gearbox 562, the motor 560 is connected to the corresponding drive wheel 30, and actuation of the motor 560 drives the drive wheel 30. In the disengaged position of the gearbox 562, the motor 560 is disconnected from the corresponding drive wheel 30, and actuation of the motor 560 does not impart a drive force to the drive wheel 30.

Figure 10:
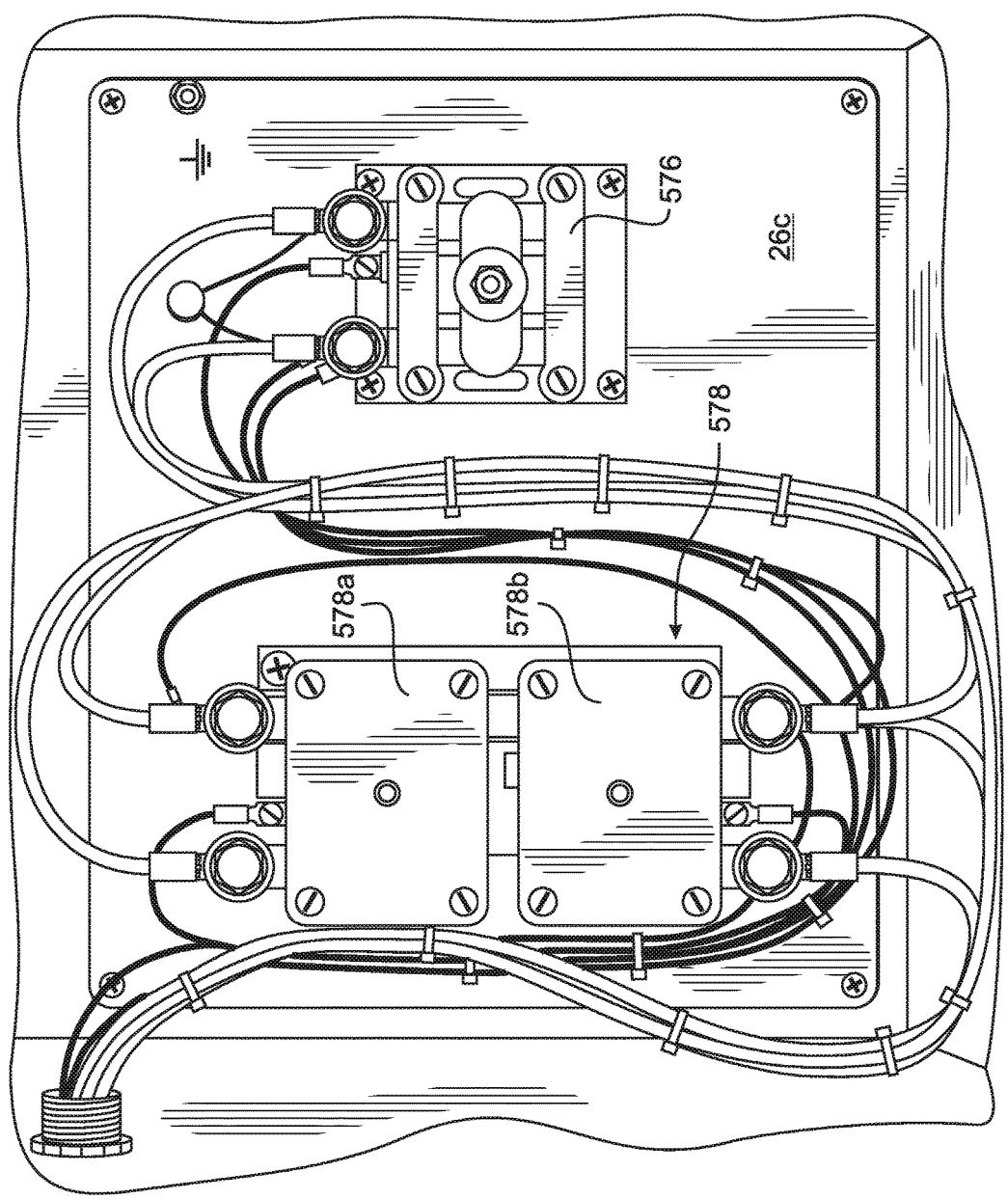
FIG. 10 is a front view of the third electrical control compartment of FIG. 9.

The electrical system 570, as shown in FIGS. 4 and 10, includes a plurality of power distribution blocks 572, a plurality of relays 574, a line contactor 576, a plurality of reversing contactors 578, and a plurality of terminal blocks 580.

The plurality of power distribution blocks 572, as shown in FIG. 4, are disposed in the first electrical control compartment 26*a*. The plurality of power distribution blocks 572 includes a positive distribution block 572*a* and a negative distribution block 572*b*. Each of the plurality of power distribution blocks 572 is capable of distributing received 24V power to a plurality of electrical wires.

The plurality of relays 574, as shown in FIG. 4, are disposed in the first electrical control compartment 26*a*. The plurality of relays 574 includes a charger relay 574*a*, a forward relay 574*b*, and a reverse relay 574*c*. Each of the plurality of relays 574 is a type of electrical relay known to those with ordinary skill in the art capable of low voltage switching between an on state and an off state.

The line contactor 576, as shown in FIG. 10, is disposed in the third electrical control compartment 26*c*. The line contactor 576 is a type of electrical contactor known to those with ordinary skill in the art capable of high voltage switching between and on state and an off state.

The plurality of reversing contactors 578, as shown in FIG. 10, are disposed in the third electrical control compartment 26*c*. The plurality of reversing contactors 578 include a first reversing contactor 578*a* and a second reversing contactor 578*b*. Each of the plurality of reversing contactors 578 is a type of electrical contactor known to those with ordinary skill in the art capable of high voltage switching between a first on state and a second on state.

The plurality of terminal blocks 580, as shown in FIG. 4, are disposed in the first electrical control compartment 26*a*.

Each of the plurality of terminal blocks 580 is capable of connecting a plurality of electrical wires.

The use of the motorized utility table 1 will now be described in greater detail with reference to FIGS. 12-17. In the shown embodiment, the motorized utility table 1 is used with an elongated concrete surface C as shown in FIG. 12. The elongated concrete surface C is disposed on a bed B which is wider than the concrete surface C and is raised from a floor F.

The motorized utility table 1 is generally used to support a concrete finishing worker laying on the top frame 16. The motorized utility table 1, as described in greater detail below, is disposed on the floor F straddling the bed B and concrete surface C, and the drive assembly 50 moves the motorized utility table 1 along the length of the bed B while the concrete finishing worker finishes the concrete surface C. The concrete finishing worker can finish the concrete surface C by smoothing the surface C, forming openings in the concrete surface C, or otherwise performing any modifications to the concrete surface C known in the art. All elements of the motorized utility table 1 are spaced from the concrete surface C during transit along the bed B to allow the concrete finishing worker to finish the surface C without unintentionally contacting and modifying the concrete surface C.

The motorized utility table 1 is initially positioned on the floor F at a location away from the concrete surface C and the bed B. A lifting device A, as shown in FIG. 12, is connected to the plurality of carry hooks 28 of the motorized utility table 1 and is used to lift the motorized utility table 1 off of the floor F. In the embodiment shown in FIG. 12, the lifting device A includes a chain hooked on and extending between the plurality of carry hooks 28 and a crane lifting the motorized utility table 1 by the chain. One with ordinary skill in the art would understand that other lifting devices A could engage the plurality of carry hooks 28 to lift the motorized utility table 1.

When the motorized utility table 1 is lifted, due to an uneven distribution of weight caused particularly by the third electrical control compartment 26c disposed on the first end 12, the motorized utility table 1 is held in a tilted position as shown in FIG. 12. The lifting device A moves the motorized utility table 1 into a position over the concrete surface C and bed B while the motorized utility table 1 is in the tilted position, as shown in FIGS. 12 and 13.

Figure 14:
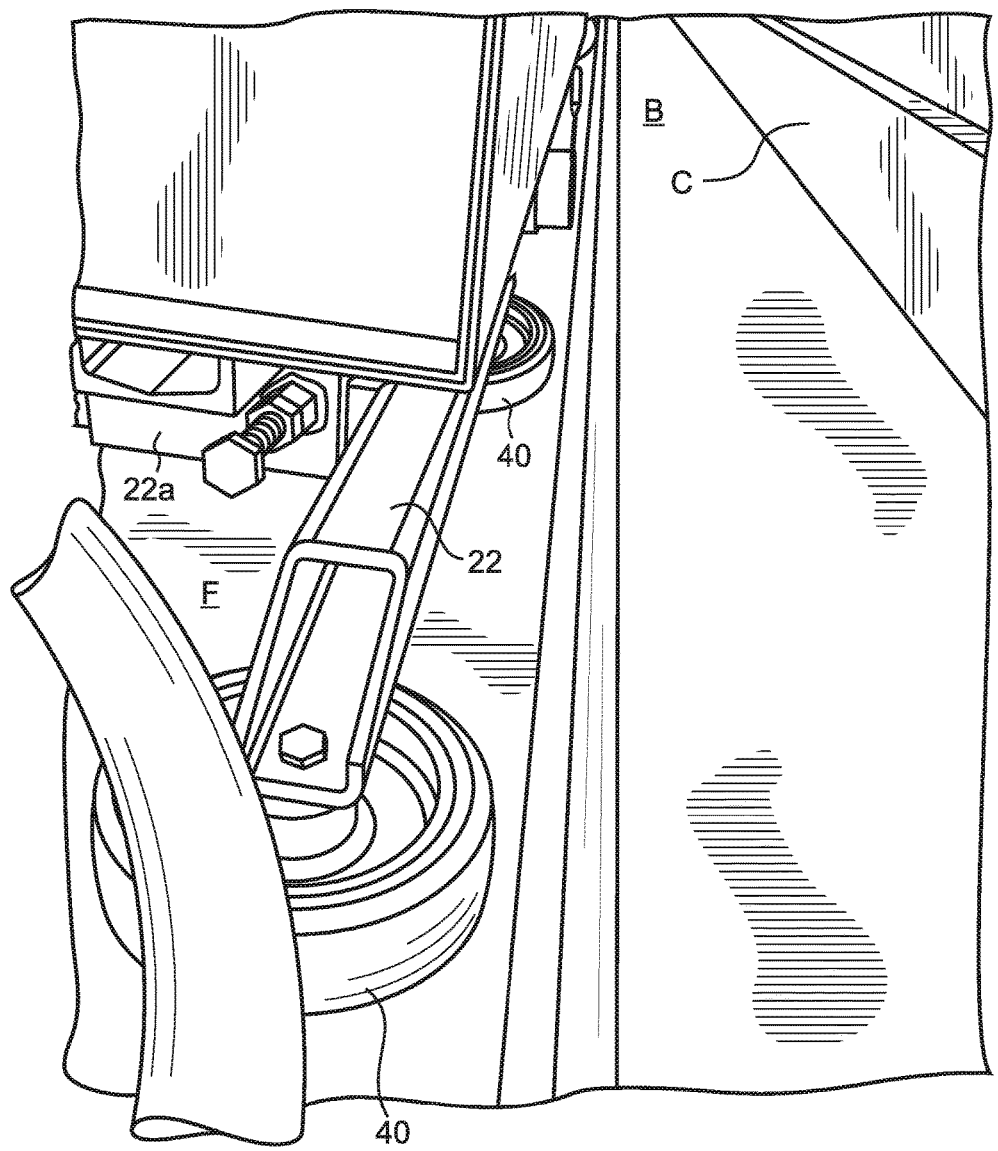
FIG. 14 is a detailed perspective view of the guide wheels of the motorized utility table according to the invention that is positioned on the base.

When the motorized utility table 1 is in the position shown in FIG. 12, the lifting device A lowers the motorized utility table 1. The drive wheels 30 on the first end 12 contact the floor F first, and the position of the motorized utility table 1 is adjusted by the lifting device A such that the guide wheels 40 on the first end 12 are disposed outside of the bed B. The lifting device A then continues to lower the motorized utility table 1 until the drive wheels 30 on the second end 14 contact the floor F and the guide wheels 40 on the second end 14 are disposed outside of the bed B. The motorized utility table 1 is then in a finishing position shown in FIG. 15 straddling and disposed over the concrete surface C and the bed B. As shown in FIG. 14, with the motorized utility table 1 in the finishing position, the finishing worker adjusts the tubular element 22b of each guide support 22 to position the guide wheels 40 attached to each guide support 22 to abut a side of the bed B. The tilted lifting and placement of the motorized utility table 1 described herein helps prevent contact between the motorized utility table 1 and the concrete surface C when moving the motorized utility table 1 into the finishing position.

With the motorized utility table 1 in the finishing position and the guide wheels 40 abutting each side of the bed B, the finishing worker lays on top of the top frame 16 and reaches down to the concrete surface C to finish the concrete surface C.

Figure 15:
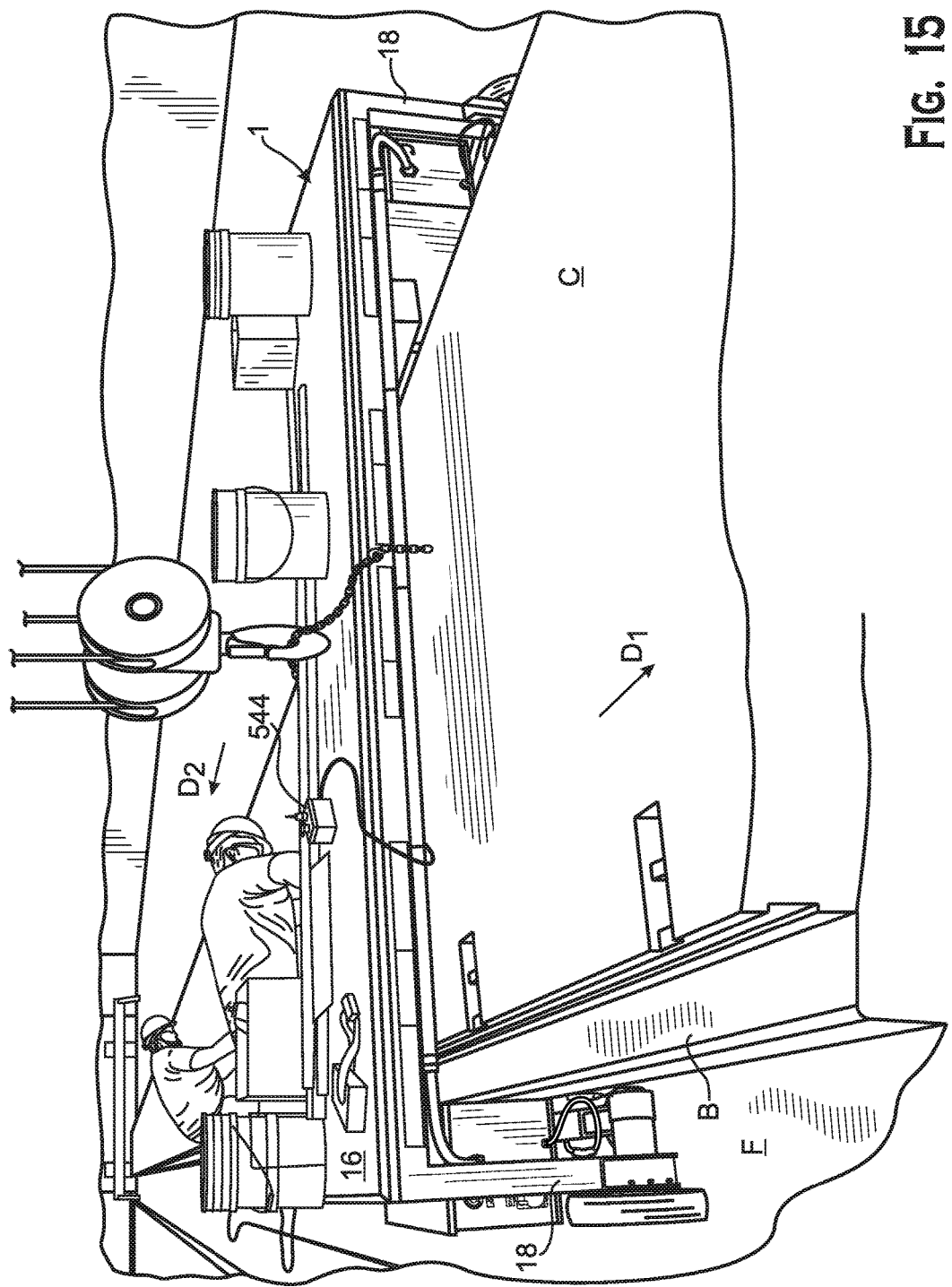
FIG. 15 is a perspective view of the motorized utility table according to the invention in a finishing and positioned above the elongated concrete surface and on the base.

The finishing worker uses the stop and start control system 544 to control activation of the motors 560. The stop and start control system 544, as shown in FIGS. 11 and 15, is movable along the top frame 16 and may be positioned at the location of the finishing worker anywhere along the top frame 16. The finishing worker inputs a direction of motion instruction using the joystick 546 by moving the joystick 546 in either the first joystick direction 546a or the second joystick direction 546b from a central position of the joystick 546, as shown in FIG. 11. The finishing worker can also input a stop instruction using the stop button 548 of the stop and start control system 544, as shown in FIG. 11.

The first joystick direction 546a and the second joystick direction 546b displayed on the stop and start control system 544 as shown in FIG. 11 are correlated to the first direction indicator 16a and the second direction indicator 16b on the top frame 16 shown in FIG. 1. Moving the joystick 546 in the first joystick direction 546a is an input to move the motorized utility table 1 in a direction indicated by the first direction indicator 16a and, correspondingly, moving the joystick 546 in the second joystick direction 546b is an input to move the motorized utility table 1 in a direction indicated by the second direction indicator 16b. The direction indicated by the first direction indicator 16a may correspond to the first direction D1 and the direction indicated by the second direction indicator 16b may correspond to the second direction D2 as shown in FIGS. 1 and 15. Alternatively, the motorized utility table 1 may be in a reversed position with respect to the concrete surface C and bed B, and the direction indicated by the first direction indicator 16a may correspond to the second direction D2 and the direction indicated by the second direction indicator 16b may correspond to the first direction D1. The correlation of the first and second joystick directions 546a, 546b to the first and second direction indicators 16a, 16b allows the finishing worker to input motion in the intended direction D1, D2 irrespective of the position of the motorized utility table 1 relative to the concrete surface C and bed B.

The finishing worker inputs a speed instruction for the motorized utility table 1 using the speed input device 552 of the speed control system 550 shown in FIG. 8.

The control of motion of the motorized utility table 1 along the bed B and concrete surface C using the drive assembly 50 with the direction of motion instruction, the speed instruction, and the stop instruction will now be described in greater detail with reference to FIGS. 15-17.

Figure 16:
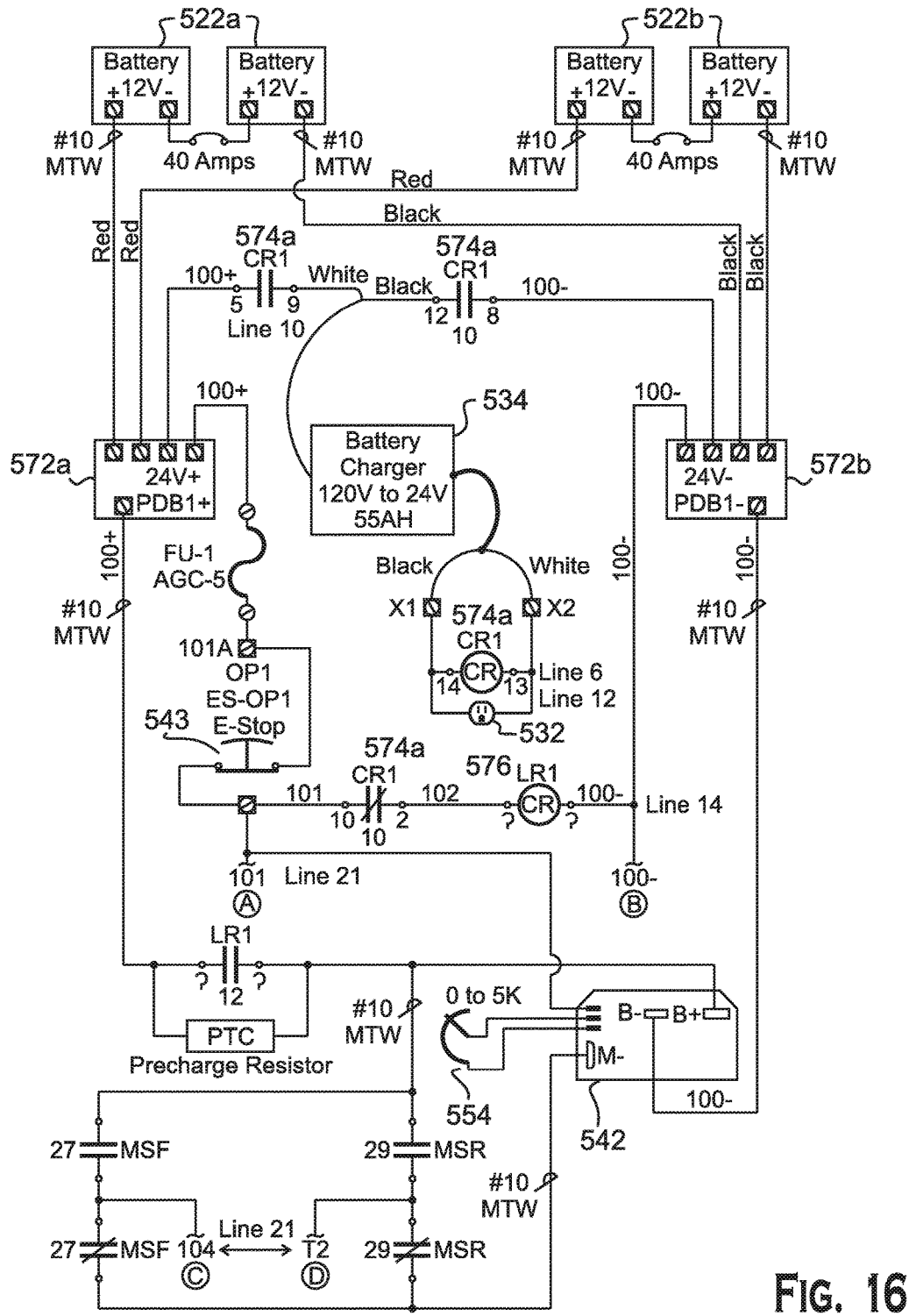
FIG. 16 is a first part of a wiring schematic of a drive assembly of the motorized utility table according to the invention.

As shown in FIG. 16, the first set of batteries 522a and the second set of batteries 522b are connected in series and electrically connected to the positive distribution block 572a and the negative distribution block 572b. Generally, the positive distribution block 572a and the negative distribution block 572b supply power to the controller 542 and the plurality of motors 560 via the plurality of relays 574, the line contactor 576, the plurality of reversing contactors 578, and the plurality of terminal blocks 580.

The finishing worker inputs a speed instruction at the speed input device 552 and the speed potentiometer 554, as shown in FIG. 16, turns the speed instruction into an electrical signal and transmits the signal to the controller 542.

Figure 17:
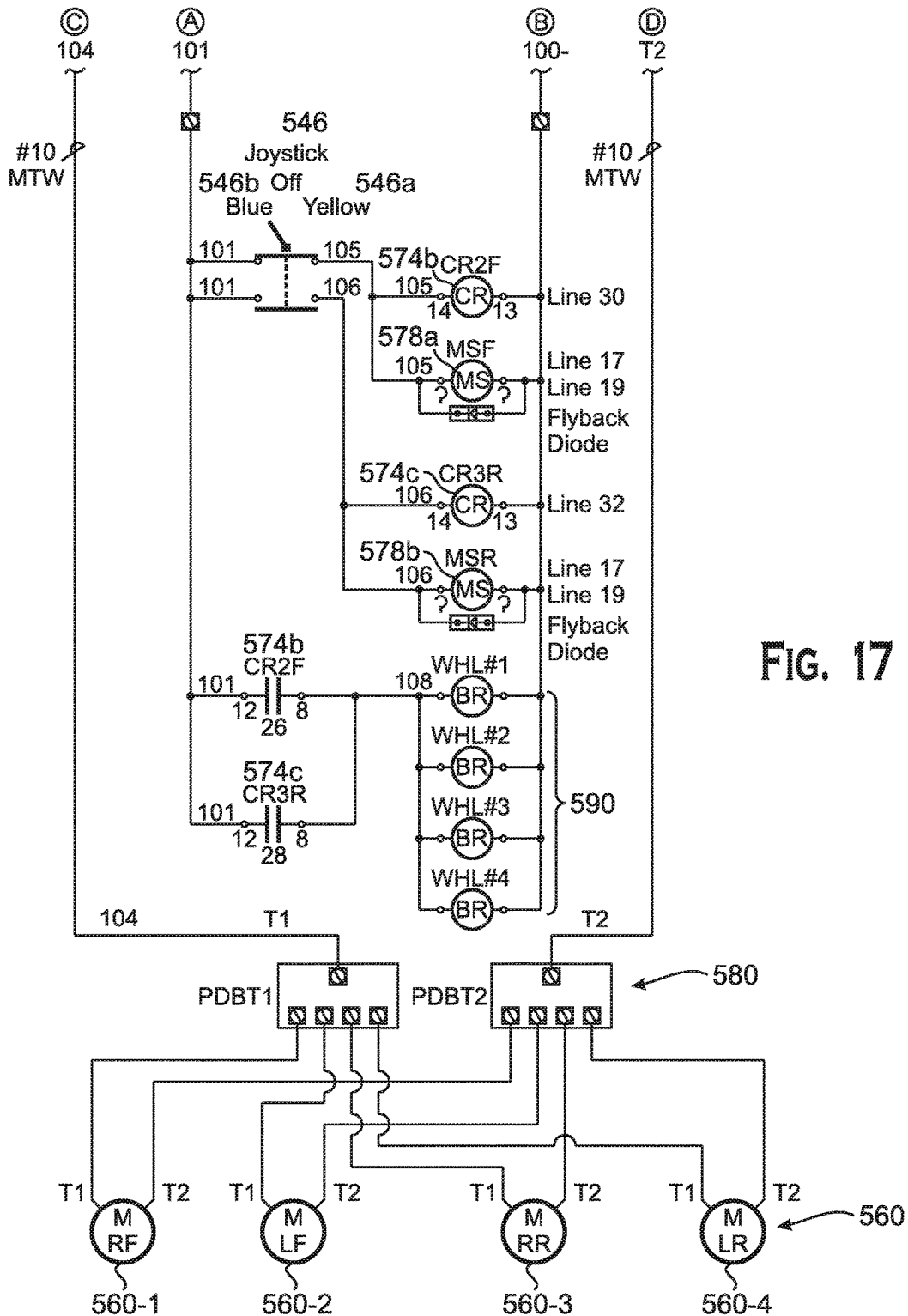
FIG. 17 is a second part of the wiring schematic of the drive assembly of the motorized utility table according to the invention.

As shown in FIGS. 16 and 17, the joystick 546 is disposed in a power path between the controller 542 and the plurality of motors 560. The power transmitted to the joystick 546 reflects the speed instruction received at the controller 542. As shown in FIGS. 16 and 17, when the joystick 546 is moved in the second joystick direction 546b, the forward relay 574b opens a circuit to a plurality of brake circuits 590 and power is transmitted along the first reversing contactor 578a through the plurality of terminal blocks 580 to the plurality of motors 560. The power drives the plurality of motors 560 in the second direction at the speed input by the speed instruction. Likewise, when the joystick 546 is moved in the first joystick direction 546a, the reverse relay 574c opens a circuit to a plurality of brake circuits 590 and power is transmitted along the second reversing contactor 578b through the plurality of terminal blocks 580 to the plurality of motors 560. The power drives the plurality of motors 560 in the first direction at the speed input by the speed instruction.

The motors 560 driven in either the first direction or the second direction, based on the speed instruction and the direction of motion instruction, drive the drive wheels 30 and move the motorized utility table 1 along the bed B and concrete surface C in the first direction D1 or the second direction D2. As described above, the finishing worker can use the motor handle 564 on each motor 560 to optionally disengage the motor 560 from the corresponding drive wheel 30 using the gearbox 562 of the motor 560.

As the motorized utility table 1 moves along the bed B, the guide supports 22 and guide wheels 40 maintain a proper position of the motorized utility table 1 with respect to the bed B and concrete surface C. The guide wheels 40 maintain contact with the sides of the bed B during motion and, if the motorized utility table 1 encounters any debris on the floor F or is otherwise moved from a straight direction D1, D2, the resilient element 22a of each guide support 22 absorbs the change in direction. The resilient element 22a allows the guide wheels 40 on each guide support 22 to maintain contact with the bed B and applies a resilient force to the guide support 22. The resilient force urges each guide support 22 back to an undeformed position in which the motorized utility table 1 is traveling straight along the first direction or second direction D1, D2.

Referring back to FIGS. 16 and 17, when the joystick 546 is positioned in the central position and not moved in either the first joystick direction 546a or the second joystick direction 546b, power does not flow to the forward relay 547b, the first reversing contactor 578a, the reverse relay 574c, or the second reversing contactor 578b. Instead, as shown in FIG. 17, power flows through the brake circuits 590 and through the plurality of terminal blocks 580 to the plurality of motors 560. The power through the plurality of brake circuits 590 stops the driving motion of the plurality of motors 560. The finishing worker can thus stop motion of the motorized utility table 1 by positioning the joystick 546 in the central position.

The finishing worker can alternatively stop motion of the motorized utility table 1 by actuating the stop button 548. As shown in FIG. 16, the stop button 548 is disposed in a power path between the plurality of power distribution blocks 572 and the joystick 546. When the stop button 548 is actuated, as shown in FIG. 16, the line contactor 576 is switched, stopping the flow of power to the joystick 546. Since power does not flow to the joystick 546 when the stop button 548 is actuated, power does not reach to the plurality of reversing contacts 578 or the plurality of brake circuits 590, and motion of the joystick 546 will not drive the motors 560.

Once the finishing worker has moved the motorized utility table 1 along the length of the concrete surface C to complete finishing of the concrete surface C, the finishing worker can recharge the plurality of batteries 522. The finishing worker plugs a power cord having a 120V plug into the charging port 532 shown in FIG. 8. The battery charger 534 is connected to the charging port 532 the plurality of batteries 522, as shown in FIG. 16, and charges the plurality of batteries 522 when the power cord is plugged into the charging port 532. Furthermore, when the power cord is plugged into the charging port 532, as shown in FIG. 16, the charger relay 574a opens the circuit and prevents power from the plurality of batteries 522 from reaching any portion of the drive assembly 50. Consequently, for safety reasons, the motorized utility table 1 is not usable during recharging. In the shown embodiment, the plurality of batteries 522 is capable of lasting as long as four work days and may be fully recharged in twelve hours using the charging system 530.

Advantageously, in the motorized utility table 1 according to the invention, the motors 560 enable the motorized utility table 1 to be moved in either direction along the concrete surface C using only the stop and start control system 544. Moving the motorized utility table 1 along the concrete surface C thus requires only the finishing worker, saving time, effort, and wage costs. Moreover, the motorized utility table 1 is rechargeable using the charging system 530, enabling repeated use of the motorized utility table 1.

What is claimed is:

1. A utility table, comprising:
    a support table having a top frame with a support surface and a pair of side frames extending downward from opposite ends of the top frame;
    a plurality of drive wheels positioned along and extending below each of the pair of side frames;
    a plurality of guide wheels positioned along an inner surface of the pair of side frames; and
    a drive assembly having a power source and control system to power the plurality of drive wheels.

2. The utility table according to claim 1, wherein the top frame includes a plurality of first direction indicators.

3. The utility table according to claim 1, further comprising a plurality of wheel supports are disposed on each of the plurality of side frames along lower corners thereof and positioned opposite the top frame.

4. The utility table according to claim 1, wherein a pair of wheel supports of the plurality of wheel supports are disposed on each side frame of the pair of side frames, each wheel support positioned along lower corners of each side frame.

5. The utility table according to claim 1, further comprising a pair of guide supports disposed between the plurality of wheel supports and positioned along an inner side of one of the plurality of side frames.

6. The utility table according to claim 5, wherein each of the pair of guide supports is attached to the side frame by a resilient element and a tubular element and connects to the plurality of guide wheels.

7. The utility table according to claim 6, wherein each of the pair of guide supports is movable with respect to the side frame by resilient deformation of the resilient element.

8. The utility table according to claim 7, wherein the resilient element applies a resilient force in any deformed position urging one of the pair of guide supports to an undeformed position.

9. The utility table according to claim 7, wherein each guide support is movable with respect to the side frame by controlled motion of the tubular element.

10. The utility table according to claim 9, wherein the tubular element is controlled to slide in and out of a receiving passageway to change a first distance between the guide support and side frame in an undeformed position of the resilient element.

11. The utility table according to claim 1, wherein the support table further includes a plurality of battery compartments and a plurality of electrical control compartments.

12. The utility table according to claim 11, wherein the plurality of battery compartments include a first battery compartment along one of the plurality of side frames and a second battery compartment positioned along another of the plurality of side frames opposite the first battery compartment.

13. The utility table according to claim 12, wherein the plurality of electrical control compartments includes a first electrical control compartment positioned adjacent the first battery compartment, a second electrical control compartment positioned adjacent the second battery compartment, and a third electrical control compartment positioned along an inner surface of one of the plurality of side frames.

14. The utility table according to claim 1, wherein the support table further includes a plurality of carry hooks attached to the top frame.

15. The utility table according to claim 14, wherein each of the plurality of carry hooks are disposed centrally along one longitudinal side of the top frame and extending between opposite ends thereof.

16. The utility table according to claim 15, wherein each of the plurality of carry hooks are each eye hooks.

17. The utility table according to claim 16, wherein the power source includes a plurality of batteries connected in series and a charging system disposed in an electrical control compartment and having a charging port and a battery charger connected to the plurality of batteries.

18. The utility table according to claim 17, wherein the charging port is disposed in a side wall of the electrical control compartment.

19. The utility table according to claim 1, wherein the control system includes a controller, a stop and start control system, and a speed control system.

20. The utility table according to claim 19, wherein the controller is disposed in an electrical control compartment and capable of receiving a plurality of control inputs and outputting control signals to a plurality of motors.

21. The utility table according to claim 20, wherein the controller has a non-transitory computer readable medium storing program instructions thereon that when executed by a processor of the controller to process inputs to output of the control signals.

22. The utility table according to claim 21, wherein the controller is a 250A 24V DC motor controller.

23. The utility table according to claim 22, wherein the stop and start control system includes a joystick movable in a first joystick direction or a second joystick direction and a stop button.

24. The utility table according to claim 20, wherein the speed control system includes a speed input device disposed in a side wall of the electrical control compartment and includes an adjustable dial for a user.

25. The utility table according to claim 24, wherein the speed control system further includes a speed potentiometer disposed in the electrical control compartment and connected to the controller, the speed control system outputs a speed control signal indicative of a position of the speed input device to the controller.

26. The utility table according to claim 20, wherein the plurality of motors are secured to each of the plurality of side frames and connected to the plurality of drive wheels.

27. The utility table according to claim 19, wherein the drive assembly further includes an electrical system having a plurality of power distribution blocks, a plurality of relays, a line contactor, a plurality of reversing contactors, and a plurality of terminal blocks.

28. The utility table according to claim 27, wherein the plurality of power distribution blocks includes a positive distribution block and a negative distribution block.

29. The utility table according to claim 28, wherein the plurality of relays include a charger relay, a forward relay, and a reverse relay.

30. The utility table according to claim 29, wherein the plurality of reversing contactors include a first reversing contactor and a second reversing contactor.

* * * * *